(12) United States Patent
Glaubitt et al.

(10) Patent No.: US 9,051,204 B2
(45) Date of Patent: *Jun. 9, 2015

(54) NONTOXIC POLYSILOXANE MATERIAL FOR PRODUCING BIOLOGICALLY RESORBABLE AND/OR BIOACTIVE ARTICLES CONTAINING POLYSILOXANE MATERIAL, ITS PRODUCTION AND USE

(75) Inventors: Walther Glaubitt, Wuerzburg (DE); Anja Ehrig, Leverkusen (DE)

(73) Assignee: BAYER INNOVATION GMBH, Duesseldorf (DE)

( * ) Notice: Subject to any disclaimer, the term of this patent is extended or adjusted under 35 U.S.C. 154(b) by 249 days.

This patent is subject to a terminal disclaimer.

(21) Appl. No.: 12/808,998

(22) PCT Filed: Dec. 9, 2008

(86) PCT No.: PCT/EP2008/010412
§ 371 (c)(1),
(2), (4) Date: Jul. 16, 2010

(87) PCT Pub. No.: WO2009/077104
PCT Pub. Date: Jun. 25, 2009

(65) Prior Publication Data
US 2011/0009023 A1    Jan. 13, 2011

(30) Foreign Application Priority Data
Dec. 19, 2007 (DE) .......................... 10 2007 061 874

(51) Int. Cl.
| | | |
|---|---|---|
| *D04H 1/00* | (2006.01) | |
| *D04H 3/00* | (2012.01) | |
| *D02G 3/02* | (2006.01) | |
| *D02G 3/00* | (2006.01) | |
| *C03B 37/01* | (2006.01) | |
| *D04H 3/009* | (2012.01) | |
| *D04H 1/4326* | (2012.01) | |
| *C03B 19/12* | (2006.01) | |
| *C04B 35/622* | (2006.01) | |
| *C08G 77/02* | (2006.01) | |
| *C08G 77/06* | (2006.01) | |
| *D01D 1/02* | (2006.01) | |
| *D01F 6/76* | (2006.01) | |

(52) U.S. Cl.
CPC .............. *C03B 37/011* (2013.01); *D04H 3/009* (2013.01); *D04H 1/4326* (2013.01); *C03B 19/12* (2013.01); *C04B 35/6224* (2013.01); *C08G 77/02* (2013.01); *C08G 77/06* (2013.01); *D01D 1/02* (2013.01); *D01F 6/76* (2013.01)

(58) Field of Classification Search
CPC ............ D01D 1/02; D01F 6/76; C08G 77/02; C08G 77/06; C03B 37/011; D04H 1/4326; D04H 3/009
USPC .......................... 442/327; 528/425; 428/457; 423/325–350; 264/5, 165, 172.11, 264/172.17, 211.14
See application file for complete search history.

(56) References Cited

U.S. PATENT DOCUMENTS

| | | | |
|---|---|---|---|
| 7,897,166 B1 * | 3/2011 | Jokinen et al. | ................. 424/426 |
| 8,206,675 B2 * | 6/2012 | Thierauf | ......................... 423/325 |
| 2006/0161089 A1 | 7/2006 | Thierauf et al. | |

FOREIGN PATENT DOCUMENTS

| | | | | |
|---|---|---|---|---|
| DE | 196 09 551 | | 7/1997 | |
| DE | 19609551 | * | 7/1997 | ............. C08G 77/02 |
| DE | 10 2004 063 599 | | 7/2006 | |
| DE | 600 35 672 | | 4/2008 | |
| DE | 60035672 | | 4/2008 | |
| DE | WO2008086970 | * | 7/2008 | ............. C03B 37/00 |
| EP | 1 144 323 | | 10/2001 | |
| FI | WO 97/45367 | * | 12/1997 | ............. C01B 33/16 |
| WO | 00/50349 | | 8/2000 | |
| WO | 0050349 | | 8/2000 | |
| WO | 2008/086970 | | 7/2008 | |
| WO | 2008086970 | | 7/2008 | |
| WO | 2008/148384 | | 12/2008 | |
| WO | 2008148384 | | 12/2008 | |

OTHER PUBLICATIONS

Biological Evaluation of Medical Devices; Part 5: Tests for In Vitro Cytotoxicity; ISO 10993-5 (1999) Includes the English Version of 30993-5 (1994).
Sakka in Sol-Gel Technology for Thin Films, Fibers, Preforms, Electronics and Specialty shapes., Ed. L.C. Klein, Neyes, Park Ridge, N.Y.; p. 140 and Figure 2.7, 1988.
International Search Report for PCT/EP2008/010412, dated Apr. 27, 2009 (6 pages).

* cited by examiner

*Primary Examiner* — Jennifer A Steele
(74) *Attorney, Agent, or Firm* — Miles & Stockbridge P.C.

(57) ABSTRACT

The invention relates to a nontoxic polysiloxane material and ripened polysiloxane material which has been formed using one or more different polysiloxane materials. According to the invention, such a ripened polysiloxane material can be spun, for example, into bioabsorbable and/or bioactive fibers and then be further processed into fibrous nonwoven webs.

16 Claims, No Drawings

NONTOXIC POLYSILOXANE MATERIAL FOR PRODUCING BIOLOGICALLY RESORBABLE AND/OR BIOACTIVE ARTICLES CONTAINING POLYSILOXANE MATERIAL, ITS PRODUCTION AND USE

CROSS REFERENCE TO RELATED APPLICATIONS

This application is a §371 National Stage Application of PCT/FR2008/010412 filed Dec. 9, 2008, which claims priority to German Application 10 2007 061 874.5 filed Dec. 19, 2007.

BACKGROUND OF THE INVENTION

1. Field of the Invention

The invention relates to a nontoxic polysiloxane material (PSN material), optionally a ripened polysiloxane material (rPSN material) which is preferably formed as one of several different polysiloxane materials (PSN materials). According to the invention, such an rPSN (r stands for ripe, ripened) can, for example, be spun into bioabsorbable and/or bioactive fibres as one of the PSN materials and then be further processed into fibrous nonwoven webs as other PSN materials. The present invention further relates to processes for producing the optionally ripened PSN material, the bioabsorbable and/or bioactive PSN materials and use for these materials.

2. Description of Related Art

There are many different endeavours under way to develop bioabsorbable materials for various applications in human medicine and medical engineering, but also in other technical fields such as filter technology, biotechnology or the insulant industry. Moreover, in these sectors, continually increasing requirements are imposed, especially on the bioactivity and the toxicological properties of the materials.

Absorbable Si polymers are known in the prior art. DE 196 09 551 C1 describes biodegradable and bioabsorbable fibre structures. These fibres can be obtained in a sol-gel process by drawing fibres from a spinning dope and drying them, if desired. The spinning dope contains one or more partially or completely hydrolytically condensed compounds of silicon, which are derived from monomers of the general formula $SiX_4$ by hydrolytic condensation. The fibres have the disadvantage that degraded as-spun they do not show good results in cytotoxicity tests and in some instances even have to be categorized as cytotoxic. Such toxicity is totally undesired especially for use in human medicine, medical engineering, filter technology, biotechnology or insulant industry, especially in the field of wound healing or the filtration of cells from bodily fluids.

Moreover, the process for producing the fibres according to DE 196 09 551 C1 has the disadvantage that the resulting mixture following removal of the solvent comprises a solid and therefore has to be subjected to a filtration. Other liquid Si polymers, which may be toxic, cannot be removed at all by filtration. Furthermore, a large proportion of the spinnable sol is lost, inter alia due to the formation of the solid phase and due to the mandatory filtration step. The process in DE 196 09 551 C1 also permits the formation of a not inconsiderable proportion of a gel-like phase of highly condensed Si compounds during ripening. This again reduces the proportion of spinnable sol dope.

SUMMARY OF THE INVENTION

It is an object of the present invention to provide a nontoxic bioabsorbable and/or bioactive material, materials containing this material and a process for producing such a nontoxic material.

According to the invention, bioactivity means a positive interaction between material or materials on the one hand and tissue (e.g. wound tissue) on the other hand with subsequent differentiation of the tissue and, as a consequence thereof, binding or adhesion of tissues along the interface between material or materials/(recipient) tissue.

The object is achieved by a sol or a colloidal solution according to claim 1 which, according to the invention, is also referred to as PSN material. Such a colloidal solution is obtained by (a) carrying out a first hydrolysis-condensation reaction (HCR) of at most one radical X of one or more different Si compounds of the formula (I):

$$SiX_4 \qquad (I)$$

in which the radicals X are identical or different and are hydroxy, hydrogen, halogen, amino, alkoxy, acyloxy, alkylcarbonyl and/or alkoxycarbonyl and are derived from alkyl radicals which are optionally substituted straight-chain, branched or cyclic radicals having 1 to 20 carbon atoms, preferably having 1 to 10 carbon atoms, and may be interrupted by oxygen or sulphur atoms or by amino groups, acid catalysed at an initial pH of 0 to ≤7, in the presence of a water-soluble solvent, over a period of from 1 to 192 hours at a temperature of from 0° C. to 80° C., (b) carrying out a second HCR of the material obtained in step (a) while at the same time removing the solvent by evaporation in a closed apparatus, in which thorough mixing of the material takes place and the evaporation takes place in vacuo between 1 and 1013 mbar and optionally by continuously introducing a chemically inert entrainment gas stream, where at least one of the process parameters pressure, entrainment gas stream and/or temperature is time-variably adjusted and the temperature of the evaporation is between 30-90° C. and the step is carried out up to a viscosity of from 0.5 to 2 Pa·s (at 4° C. and 10 l/s), (c) cooling this PSN material in a closed apparatus in a period from a few minutes to a few hours, and (d) converting the PSN material obtained from (c) into a ripened polysiloxane material (rPSN) material via a third HCR.

DETAILED DESCRIPTION OF A PREFERRED EMBODIMENT

It remains to be stressed that the (nontoxic, bioabsorbable and/or bioactive) PSN or rPSN material according to the invention can be produced without the preparation process involving, or having to involve, one or more filtration steps. This is a significant difference to the process which is known from DE 1 96 09 551 C1. If desired, step (d) is followed by a fourth HCR as one of the following steps (e1) to (e4), by means of which the rPSN material obtained in step (d) can be used to produce one of the PSN materials such as fibre (e1), powder (e2), monolith (e3) or coating (e4). Accordingly, these steps involve the following measures:

(e1) spinning the PSN material into bioabsorbable and/or bioactive fibres;

(e2) processing the material from step (d) into a powder by subjecting the rPSN material obtained to a drying operation, in particular to a lyophilisation, and comminuting (grinding) the dried PSN material to a powder;

(e3) pouring the rPSN material from step (d) into a mould and drying;

(e4) applying the rPSN material from step (d) to an article to be coated, or dipping the latter into the rPSN material.

It is particularly preferred when the rPSN material/the rPSN materials has or have, in use, a pH of from 5 to 7, in particular of ≥6 so that it/they has/have an acceptable (physiological) compatibility. Below pH 5, the material is incompatible merely on account of its acidic character. Since step (b) involves evaporating to a low water content, the acid strength in the virtually anhydrous system cannot be defined as a specific pH. Rather, the optional buffering (i.e. addition of a suitable buffer or an alkali) or reduction in acid strength (e.g. in the case of nitric acid by expelling/evaporating NO or $NO_2$) in (b) should take place such that the rPSN material ultimately obtained after (e), or the PSN materials moulded therefrom, has/have a pH of from 5 to 7, in particular of ≥6, upon watering.

In order to achieve this, it is preferred to reduce the acid strength in step (b), or to buffer the effect of the acid. However, if this is not already done in step (b), or not done to the preferred level, it can also be done subsequently in step (c) or (e) or else not until directly before application of the PSN materials (e.g. to the skin or wound). However, establishing the correct acid strength or effect in step (b) is unequivocally preferred in accordance with the invention.

Reducing the acid effect in one of steps (b), (c) or (e) or during the watering of the PSN materials can take place in particular by means of Tris (tris(hydroxymethyl)aminomethane) in the form of the free base or of a salt (e.g. Tris acetate, Tris phosphate).

The individual steps of the aforementioned reactions are discussed in more detail below.

Step (a)

In step (a) use is made of a radical X of one or more different Si compounds of the formula (I):

$$SiX_4 \qquad (I)$$

in which the radicals X are identical or different and are hydroxy, hydrogen, halogen, amino, alkoxy, acyloxy, alkylcarbonyl and/or alkoxycarbonyl and are derived from alkyl radicals which are optionally substituted straight-chain, branched or cyclic radicals having 1 to 20 carbon atoms, preferably having 1 to 10 carbon atoms, and may be interrupted by oxygen or sulphur atoms or by amino groups.

In one preferred embodiment according to the invention, X in the formula (I) is an optionally substituted straight-chain, branched and/or cyclic alkoxy radical having 1 to 20 carbon atoms, preferably having 1 to 10 carbon atoms. Particularly preferably, X in the formula (I) is an optionally substituted straight-chain and/or branched $C_1$-$C_5$ alkoxy radical. Further particular preference is given to substituted, but preferably unsubstituted, straight-chain and/or branched $C_2$-$C_3$ alkoxy radicals, such as, for example, ethoxy, N-propoxy and/or isopropoxy.

According to the invention, very particular preference is given to using tetraethoxysilane (TEOS) as the sole Si compound of the formula (I) in the (first) HCR according to the invention.

The initial pH of from 0 to ≤7, preferably of 2-3.5, is established, for example, using dilute nitric acid (e.g. 1 N, preferably with 0.01 N $HNO_3$). However, in principle, all acidic mixtures and solutions which are suitable for producing NO or $NO_2$ in situ are suitable. These may be, for example, also acidic mixtures and solutions which, in a physiological environment with molecular oxygen, produce nitrogen monoxide (NO) enzymatically (by means of a nitroxide synthase, NOS), which in turn is rapidly converted to $NO_2$ by the body, or may also be organic nitrates or nitrate esters (so-called NO donors), for example ethyl nitrate, which form NO with the aid of an organic nitrate reductase. This enzymatic release of NO requires thiol groups (cysteine).

Besides the dilute nitric acid, according to the invention, an aqueous or alcoholic (particularly preferably, an aqueously diluted ethanolic) solution of a physiologically compatible acid (e.g. citric acid, succinic acid, tartaric acid, acetic acid or ascorbic acid) and at least one essential amino acid (e.g. L-arginine, particularly preferably; L-valine, L-leucine, L-isoleucine, L-phenylalanine, L-thyroxine, L-methionine, L-lysine or L-tryptophan) or nonessential amino acid (e.g. L-glutamine, L-glutamic acid, L-asparagine, L-aspartic acid, L-cysteine, L-glycine, L-alanine, L-proline, L-histidine, L-tyrosine) as substrate of the NOS is therefore also suitable for adjusting the pH to the desired value in the weak to medium-strength acidic range.

If dilute nitric acid (e.g. 0.01 N) is used for establishing the pH, it is preferably used in a molar ratio of Si compound(s) of the formula (I)/nitric acid of 110:1 to 90:1, more particularly preferably 100:1. The nitric acid is advantageously used such that the molar ratio of Si compound of the formula (I) (e.g. TEOS)/$HNO_3$ is about 100:1.

The water-soluble solvent which is preferably used in step (a) according to the invention is ethanol or an ethanol/water mixture which has the function of dissolving, or at least emulsifying, the Si compound(s) of the formula (I). If the Si compound of the formula (I) is TEOS, water does not dissolve/emulsify the Si compound of the formula (I) and it is therefore preferably mixed with EtOH as solubilizer. The preferred amount of EtOH is 1 to 1.5 mol/mol of TEOS and, according to one particularly preferred embodiment, is 1.26 mol/mol of TEOS.

According to the invention, a very particularly preferred reaction batch is carried out in accordance with the mass ratios and/or molar ratios specified below. The reaction vessel is initially charged with 1 mol of TEOS, to which 1.26 mol of EtOH are then added. This mixture is stirred, so that the EtOH dissolves the TEOS. Separately, 27.81 g of 1 N $HNO_3$ (corresponds to 1.75 g of $HNO_3$) are diluted with 60.38g of $H_2O$ (the total mass of the dilute nitric acid is thus 88.19 g, of which 86.44 g are accounted for by $H_2O$, corresponding to 4.8 mol, and 1.75 g by $HNO_3$), corresponding to 0.028 mol; the $H_2O$/$HNO_3$ molar ratio is 4.8/0.028=172. Then, 33.07 g of the dilute nitric acid are added to the ethanolic TEOS solution (so that 1.8 ml of $H_2O$ and 0.01 mol of $HNO_3$ are used per 1 mol of TEOS.

The first HCR proceeds exothermally. According to the invention, the first HCR means, as illustrated using the example of TEOS, that in each case one EtO group in in each case one molecule of TEOS hydrolyses and the resulting OH group condenses with dimerization and water elimination with continuous stirring. I.e. the two solutions (for example TEOS in EtOH and dilute nitric acid) are combined at room temperature (RT), where the temperature during the reaction of 2 $SiX_4$ (i.e. e.g. of 2 TEOS) via hydrolysis and condensation of one EtO radical in each case to form $X_3Si$—O—$SiX_3$ (e.g. $(EtO)_3$—Si—O—Si—$(EtO)_3$) increases by about 40° C. in the case of an adiabatic procedure. The initial temperature during the first HCR is not significant here (since the reaction in any case proceeds exothermally). It may be RT, but may also be below or above the particular RT, e.g. 5, 10, 15, 20, 35, 45, 60 or 70° C. It must merely be sufficiently high to enable the first HCR to proceed.

According to the invention, the hydrolysis of more than one EtO group per TEOS molecule is particularly preferably avoided. RT (about 20° C., where appropriate 18-25° C.) is therefore preferable for economic and practical reasons. Temperatures deviating from RT in the range from 0° C. to 80° C., preferably in the range from 10° C. to 70° C. or in the range from 20° C. to 60° C. are likewise suitable, where, in the event of exceeding the boiling point under standard conditions, a reaction under pressure is required. The temperature is of course subject to the customary relationship in chemistry whereby a lower temperature requires longer reaction times—and vice versa. In one preferred embodiment of the present invention, this first HCR is carried out over a period of 1-192 hours (h), more preference being given to periods of 8-24 h. Alternatively, preference is given to a period from 8 to 17 h.

The first HCR is preferably carried out discontinuously in a stirred container. The Si compound of the formula (I) (e.g. TEOS) and the solvent (e.g. ethanol) are preferably charged as initial charge. This is followed by the rapid addition of the acid, preferably in the form of 0.01 N $HNO_3$ (e.g. 0.01 mol of $HNO_3$ per mole of TEOS). On account of the acid strength in the reaction mixture, the first HCR proceeds quickly, and the contents of the container heat up to about 30° C. to 40° C. before the temperature starts to drop still during the reaction time (thus in step (a)) (as a consequence of cooling to the ambient temperature or heating means temperature).

Step (b)

Through a second HCR of the material obtained in step (a) in a closed apparatus, in which thorough mixing is possible (e.g. rotary evaporator, stirred tank) with simultaneous removal of the water-soluble solvent (e.g. water, ethanol) by evaporation in vacuo between 1 and 1013 mbar, preferably at a pressure of <600 mbar, and optionally with the continuous introduction of a chemically inert entrainment gas stream (for lowering the partial pressure of the vaporizing components) takes place, where at least one of the process parameters pressure, entrainment gas stream and/or temperature is time-variably adjusted and the evaporation takes place at a reaction temperature of about 30° C. to 90° C., preferably between about 60° C. and 90° C., particularly preferably at about 60-70° C. and preferably with gentle thorough mixing of the reaction system up to a viscosity of the mixture to 0.5 to 2 Pa·s (at 4° C. and 10 l/s), preferably to ca. 1 Pa·s (measurement at 4° C., shear rate 10 $s^{-1}$).

As a result of the progressing reaction/polymerization (evident from an increase in viscosity), the phase equilibrium shifts such that the corresponding equilibrium pressure of the solvent in the vapour phase becomes lower and lower. If the equilibrium pressure drops to the total pressure in the gas phase, the evaporation stops.

In order to further vaporize solvent, it is therefore necessary to reduce the pressure, to variably adjust the entrainment gas stream and/or to increase the temperature.

In one preferred embodiment of the invention, the evaporation in step (b) takes place at a constant temperature and time-variable pressure.

Step (b) should without question proceed with the exclusion of water so that no further hydrolysis can take place. Temperatures above 60° C. are particularly preferred in order, in the case of the concentration of the $HNO_3$, which otherwise significantly increases in the remaining solvent, to favour a reductive reaction of the $HNO_3$ to NO. This very readily volatile gas (boiling point under standard conditions about −150° C.) is oxidized after escaping from the liquid phase upon contact with air to give the readily boiling $NO_2$ (b.p. about 21° C.), which is removed from the system with the stream of waste air and/or gas. In this way, the acid concentration in the PSN material is restricted or reduced.

According to the invention, "entrainment gas stream" refers to a gas stream which is introduced into the gas volume via the liquid phase of the reaction system. In order to observe the isobaric ratios in the reaction vessel, a gaseous volume stream must thereby be discharged which consists both of the "entrainment gas" and also of the component(s) to be evaporated. The resulting lowering of partial pressure, i.e. the reduction in the proportion of component or component mixture to be evaporated in the gas phase increases the driving force for the evaporation of the solvent at the liquid surface.

In one particularly preferred embodiment, the "entrainment gas stream" is distributed by means of a gas distributor suitably arranged in the gas space of the apparatus in such a way that adequate entrainment gas exchange is ensured just above the liquid surface but without flow toward the liquid surface in a direct convective manner. In extreme cases, the latter may lead to local gelling, which is undesired. Gas distributors by means of which this embodiment can be realized are known to the person skilled in the art.

In one preferred embodiment of the invention, the chemically inert entrainment gas stream used for lowering the partial pressure is nitrogen and/or air.

In one preferred embodiment of the invention, the water-soluble solvent is removed by means of a combination of a vacuum and entrainment gas stream. In this embodiment of the invention, the total pressure and entrainment gas stream can be adjusted, independently of one another, in a constant manner or in a time-variable manner. However, in this embodiment of the invention, at least one of the process parameters of pressure, entrainment gas stream and/or temperature is time-variably adjusted. Consequently, it is possible to achieve e.g. in an integral manner, a certain reaction time for a desired degree of evaporation and/or to adjust the evaporation rate to the reaction kinetics.

In one preferred embodiment of the invention, the evaporation in step b) will take place at a constant temperature and time-variable pressure, in which case the pressure towards the end of the second HCR, starting from atmospheric pressure or slight subatmospheric pressure, is reduced to <600 mbar, preferably <500 mbar, particularly preferably <100 mbar.

In this combination procedure (vacuum with entrainment gas stream), a constant or variable subatmospheric pressure of <600 mbar is preferred.

It is particularly preferred to allow step (b), the step of the so-called reactive evaporation, to proceed until the viscosity has risen to about 1 Pa·s and consequently the sol properties required for carrying out the subsequent step (c) are present. If the viscosity is too low (premature termination), the kinetics in step (c) are too slow. If the viscosity is too high, undesired gels are formed which adversely affect further processing.

Preferably, step (b) is ended by cooling to temperatures below 10° C. and preferably by establishing atmospheric pressure (about 1013 mbar).

The reactive evaporation takes place at (partial) pressure and temperature ratios which, on the one hand, are suitable for largely concentrating the sol through evaporation of solvent, and on the other hand, in the case of using $HNO_3$, favour a reduction in the acid strength, and furthermore from the point of view of reaction kinetics, provide the (pre-)structures required for the subsequent process steps. Temperatures around 70° C. are preferred.

If in step: (a) dilute nitric acid is used as acid, the possible and preferred reduction in the acid strength in step (b) takes place by the acid decomposing during the reactive evaporation to form NO and water or, in the presence of oxygen, $NO_2$ and water. N in the form of NO or $NO_2$ is then only expelled to a (very substantial) degree, a (very small) portion remains in the sol/the colloidal solution. If, however, the system uses organic acid/arginine instead of nitric acid, the pH is raised, or the acid strength is reduced, if desired, by means of e.g. Tris solutions (when the acid, e.g. acetic acid, cannot be expelled).

Surprisingly, it has now been ascertained that, when observing the conditions as have been described above for step (a) and (b) and after removing the solvent in step (b), a colloidal solution is obtained which no longer requires any filtration prior to the ripening in step (d), i.e. it does not contain any troublesome solids.

Step (c)

This step, which is a cooling operation, is sensibly characterized in that the colloidal solution obtained in step (b) is transferred rapidly, i.e. within a few minutes (preferably within 2 to 5 minutes) to within a few hours, preferably 0.2 to 5 hours, particularly preferably within half an hour, to a closed, preferably gas diffusion tight, container and cooled down to the temperature at which step (d) is carried out.

Accordingly, the temperatures to which cooling is preferably carried out are −20° C. to 10° C., preferably 2° C. to 4° C., particularly preferably 4° C. The ingress of moisture, e.g. as atmospheric humidity or moisture adhering to the container, must be avoided at all costs. Where appropriate, this step also involves an adjustment being made to the material such that the pH of the subsequent materials to be applied to the article is pH 5 to 7, preferably pH>6.

Step (d)

The kinetic controlled ripening is a constituent part of the process according to the invention in that without it the reaction mixture (PSN material) obtained after step (c) would not be processible, for example spinnable or else coatable, at all. This step (d) involves a third HCR wherein the viscosity of the reaction mixture further increases as a result of the continuing polymerization.

According to the invention, step (d) takes place in closed, preferably gas diffusion tight, vessels, for example in so-called ripening beakers, preferably in the vessels which have already been used for step (c). The ingress of moisture or other gases, including $CO_2$, should be avoided at all costs. According to the invention, the preferred way of performing step (d) is at a temperature of (above) −20° C. to 10° C. over a period of from 1 day up to 8 weeks, preferably at 2° C. to 4° C. and over a period of from 3 to 18 days. Particularly preferably, the ripening is carried out over a period of from 10 to 14 days at 4° C., in particular by vibration-free storage of the reaction mixture in closed, preferably gas diffusion tight, vessels. However, the ripening can just as preferably take place at any temperature in the range from (above) −20° C. to 10° C.

The person skilled in the art is aware that temperature and reaction time are two mutually independent variables which are adjusted to each other, preferably such that the rPSN material obtained in step (d) assumes a dynamic viscosity which makes it suitable and prepares it for the performance of one of the steps (e1) to (e4). If the material is to be spun into fibre in a step (e1), the dynamic viscosity at the end of (d) should be about 30 to 100 Pa·s, preferably 45 to 60 Pa·s (shear rate 10 $s^{-1}$ at 4° C.) with a loss factor (at 4° C., 10 l/s, 1% deformation) of from 2 to 5, preferably from 2.5 to 3.5 (the loss factor is the quotient formed from the viscous and elastic proportion of the dynamic viscosity). If, by contrast, the material is to be processed to a powder in a step (e2), the dynamic viscosity at the end of (d) is about 60 Pa·s (shear rate 10 $s^{-1}$ at 4° C.). In the case of the material being processed into a monolith (in a step e3)), the dynamic viscosity at the end of (d) is preferably greater than or equal to 70 Pa·s (shear rate 10 $s^{1}$ at 4° C.). And if the material is to be used in a step (e4) for coating articles or surfaces, the dynamic viscosity is less than or equal to 10 Pa·s (shear rate 10 $s^{-1}$ at 4° C.), depending on the desired layer thickness.

An excessively high loss factor means an excessively high elasticity of the material, which is an obstacle, e.g. to the formation of a stable filament during spinning (gelation, tearing of the filament). In the event of the loss factor being too low, the material is so flowable that stable filament formation is not possible (dripping).

The end product of the ripening in the ripening beaker is a sol (the rPSN material) having specific rheological properties, inter alia a structural viscosity. Structural viscosity is the property of a fluid to exhibit a lower viscosity at high shear forces; the greater the shearing which acts on the fluid, the less viscous the fluid is. The decrease in the viscosity arises as a result of the action of a force on the polymers in the sol, which ensures that said polymers become aligned and are therefore better able to glide past each other; for further information on this, particularly concerning the size and shape of the structures which constitute spinnability, see Sakka in *Sol-Gel Technology for Thin Films, Fibers, Preforms, Electronics and Specialty Shapes.*, ed. L. C. Klein, Neyes, Park Ridge, N.Y., 1988, page 140 and FIG. 2.7.).

Thus, according to the invention, the competing formation of a three-dimensional polymeric gel network is advantageously (largely) suppressed, the end product of the process according to the invention, after step (d), thus advantageously being a hydrophobic sol having ethoxy groups without gel content which is (largely) free from water.

Since the kinetically controlled ripening, i.e. step (d), proceeds only very slowly below −20° C., the PSN material after step (c) can be "frozen" at temperatures below −60° C. This is a preferred variant insofar as the PSN material (before step (d)) can be stored and transported exactly like the rPSN material after step (d).

Step (e1)

The spinning process for processing the sol into fibre is carried out under customary conditions as described, for example, in DE 196 09 551 C1 and DE 10 2004 063 599 A1. In the process, the rPSN is blown via a pressurized vessel through a die head having up to 250 individual dies (pressure in the container 1-100 bar, advantageously 20 bar). The sol emerging from the (cold) die experiences, upon falling through the (warm) spin shaft, a further (fourth) HCR which is responsible for the fact that the material emerging from the die reacts via (molecular) crosslinking to give a (stable) fibre. The spin shaft usually has a length of 1-5 m, advantageously 2 m. The climate in the spin shaft is temperature and humidity controlled (preference being given to temperatures between 20° C. and 30° C. and −5 to 10° C. dew point), and, if desired, it is also possible to set an atmosphere here with further reactants (e.g. ethyl nitrate).

After falling through the spin shaft, the fibres are laid down e.g. on a traversing table. The mesh size of the fibrous nonwoven web thus formed is controlled inter alia via the traversing speeds. This is of the order of a few cm/s. A twin-axle agitation thus creates a narrow-mesh fibrous nonwoven web wherein, based on TEOS as Si-containing starting compound, as a rule still more than 30% of the ethoxy groups are present.

The fibres produced according to the invention in step (e1) exhibit a certain hydrophobicity on account of the ethoxy groups still present. They are moreover (largely) free from solvents (water, ethanol).

In fact, one preferred embodiment of the invention consists in producing the fibres, or fibrous nonwoven web, according to step (e1), or the powder, the monolith and the coated articles/surfaces according to step: (e2), (e3) and (e4), and storing, transporting and distributing these embodiments according to the invention.

If dilute nitric acid is used as acid in step (a), the possible and preferred reduction in the acid strength in step (e1), (e2), (e3) and (e4) takes place by the remaining, enclosed portion of the $HNO_3$ escaping as NO or $NO_2$ by off-gassing in air at preferably 30° C. If, however, the system uses organic acid/arginine instead of nitric acid, the increase in the pH, or the reduction in the acid strength, takes place if desired e.g. by means of Tris solutions (if the acid, e.g. acetic acid, cannot be driven off) shortly before application by rinsing in an aqueous Tris solution.

Step (e2)

Before or else during drying, the rPSN material from step (d) (which, on account of its bioactivity, can be considered an active ingredient) can be admixed with any desired (further) active ingredients, for example pharmaceutically active substances, or be covalently bonded with a further, fourth HCR (hereinbelow the term "active ingredient", however, generally refers not to the rPSN material from step (d), but the further active ingredient). This should preferably be effected by producing a homogeneous mixture. Particularly in the case of admixing thermally sensitive active ingredients, the mixture of PSN material and active ingredient(s) after the fourth HCR is subjected to gentle drying, e.g. spray-drying or freeze-drying. If the active ingredient is not thermally sensitive or if no active ingredient is added at all, drying can also be effected at (considerably) elevated temperatures. In this process, a bioabsorbable and/or bioactive matrix is preferable formed around the active ingredient. This matrix is in particular also suitable for the encapsulation of liquid active ingredients. Liquids can be enclosed in the matrix with long-term stability and be released again in a controlled manner. Encapsulation permits mechanical and chemical stabilization of the active ingredients, improved handlability of such liquid active ingredients and medicaments, and helps to prevent uncontrolled volatilization of the active ingredients. It is of course possible for further substances and/or auxiliaries appropriate to the particular use to be present in the final formulation (powder). Applications without additional active ingredient are e.g. additives for skin creams etc., as described for example in http://www.photolagen.com.

The powder may be a micropowder and/or a nanopowder. The particles of a micropowder according to the invention preferably have a size (an average diameter) of from 0.01 μm to 100 μm, in particular 0.1 μm to 20 μm. The nanopowder particles generally have a size (an average diameter) of ≤100 nm.

Step (e3)

In a further embodiment, the rPSN material from step (d) (again before or during drying) can be admixed with a (further) active ingredient, for example a pharmaceutically active substance, or be covalently bonded by means of a fourth HCR. This is then followed, regardless of the presence of the (further) active ingredient, by the casting of the rPSN material into a shape. After drying, a monolith can be obtained in this way. Such monoliths can be used in the form of massive implants as drug delivery system subcutaneously, for example. They can be used for example as a depot for contraceptives and release the active ingredient over a prolonged period. Such implants according to the invention have good biological compatibility. The monoliths can preferably have a diameter of ≥0.5 mm. Alternatively, the monoliths can also be comminuted and ground to powder.

Step (e4)

However, the ripened material from step (d) can also be processed into a coating. For this, the article to be coated is coated by dipping into the rPSN material, by irrigation with the rPSN material or by thin-coating or spraying the rPSN material. Preferred coatings are those on coated tablets or capsules, for which pressed pulverulent medicament mixtures are provided with a bioabsorbable and/or bioactive coating of the rPSN material. This allows the release of (further) active ingredients (e.g. via the layer thickness and/or the layer sequence) within the formulation to be monitored and/or controlled. However, such a coating can also be applied to body-part implants, which improves the (biological) compatibility of the implant, e.g. rejection reactions are alleviated or prevented.

According to a further embodiment of the invention, high-viscosity sols, in particular hydrogels, can be supplemented or replaced by the rPSN material according to the invention. The high-viscosity sols and the hydrogels are used in medicine and in cosmetics as active ingredient or medicament carriers. Generally, hydrogels are used widely in the care of large-area wounds (wound treatment and wound healing). Advantageously, the addition of the rPSN material can improve the biological compatibility and hence wound healing. The hydrogels according to the invention can in this respect be advantageously used as bioabsorbable and/or bioactive products in medicine, in particular human medicine or medical technology.

Further Processing and Use of the Fibre

The fibres as end products of one of the processes preferred according to the invention involving the steps (a) to (d), and (e1) can be used as fibres or else as fibrous nonwoven webs. These PSN materials, like the PSN and rPSN material, have excellent bioabsorbability and/or bioactivity.

Before using the PSN materials, preferably directly before using them, e.g. as bioabsorbable and/or bioactive materials in human medicine or medical technology (e.g. for wound treatment, wound healing, as surgical suture materials or as reinforcing fibres; see also next paragraph below), the PSN material (fibre, powder, monolith, coating solution) are preferable watered and particularly preferably watered under slight external pressure. Watering serves to completely hydrolyse the remaining ethoxy groups still present, thus making the materials more hydrophilic. As already mentioned above, this watering can take place under pH-increasing conditions (e.g. in a phosphate buffer $H_2PO_4^-/HPO_4^{2-}$), particularly if the pH has not already been raised in a preceding step. In this process, the sixth and last HCR proceeds, during which the nonhydrolysed ethoxy groups still remaining are removed from the PSN materials.

A further advantage is that the PSN or rPSN material produced according to the invention and the materials consisting thereof have considerably improved values in cytotoxicity tests compared with the fibres and fibre materials which have been obtained by the process of DE 196 09 551 C1. This improvement has been demonstrated in tests in the presence of L929 mouse fibroplasts. The materials which are obtained according to the invention from steps (e1) to (e4) are therefore notable for particularly good biocompatibility.

The fibres or fibrous nonwoven webs produced according to the invention can therefore be advantageously used as bioabsorbable and/or bioactive materials in human medicine, medical technology, filter technology, biotechnology or the insulant industry. In particular, the materials produced according to the invention can be advantageously used in the area of wound treatment and wound healing. Fibres can be used for example as surgical suture materials or as reinforcing fibres. Fibrous nonwoven webs can be used particularly advantageously in the care of superficial wounds, in the filtration of bodily fluids (e.g. blood) or in the field of bioreactors as a cultivation aid.

The PSN materials according to the invention from (e1), (e2), (e3) and (e4), which can be loaded with a bioactive substances, i.e. contain a further active ingredient besides the bioactive Si polymer, are able to transport these to the actual site of action and/or influence the release of the active ingredient at the site of action. These materials are referred to below as drug delivery system. The use of the ripened PSN material according to the invention and of the PSN materials according to the invention has the advantage that both can be processed, used and combined with various (further) active ingredients in many different ways. It is particularly preferred if the rPSN material according to the invention does not in the process form any reaction products with the (further) active ingredient. The PSN materials according to the invention are bioabsorbable and/or bioactive and exhibit improved cytotoxicity values, which contributes to improved biocompatibility of the materials, which is necessary especially in the fields of medicine and medical technology.

The invention will now be explained in more detail by reference to the following example, without being limited thereto.

All of the stated viscosities were measured using a MCR 300 viscometer from Physika at a shear rate of $10\ s^{-1}$ at 4° C.

EXAMPLES

Example 1

Bioabsorbable and/or Bioactive rPSN Material (sol) and its Processing into Fibres and Fibrous Nonwoven Webs As starting material for the hydrolysis condensation reaction, 2.7 mol of TEOS (tetraethoxysilane) (562.4 g) were initially introduced into a reaction vessel. 3.4 (2.7—1.26) mol of EtOH (156.8 g) were added as solvent. The mixture is stirred. Separately, 1 N $HNO_3$ (27.81 g) was diluted with $H_2O$ (60.38 g) and added to the TEOS-ethanol mixture. The resulting reaction mixture comprises 1.8 mol of $H_2O$ and 0.01 mol of $HNO_3$ per mole of TEOS. The mixture was stirred for 18 hours.

The mixture obtained after step (a) was subsequently rendered virtually water-free and ethanol-free by evaporating in a rotary evaporator (step b) at 70° C. with stagewise application of a vacuum of 500-200 mbar with slow stirring (20 rpm). As a result of the high temperature, the $HNO_3$ was greatly reduced in the reduced form $NO_2$. The sol had a viscosity of about 1 Pa·s (shear rate of $10\ s^{-1}$ at 4° C.), the acid strength decreased greatly. The solution was cooled down to 4° C. in step (c) in a closed polypropylene beaker (ripening beaker) over the course of 30 minutes and was subjected to ripening at this temperature in step (d) in the ripening beaker for 8 days. A homogeneous single-phase sol dope with a viscosity of ca. 40 Pa·s (shear rate $10\ s^{-1}$ at 4° C.) was obtained. The sol was present without a discernible solid phase.

The sol could be spun into fibres in step (c1). It is also referred to as spinning dope and as rPSN material. The fibres were produced in a conventional spinning system. For this, the spinning dope was filled into a pressurized cylinder cooled to −15° C. which was pressurized with a pressure of 20 bar. The force resulting therefrom forced the spinning dope through the dies. The emerging spinning filaments had a diameter from 30 to 70 µm depending on the local temperature and thus viscosity of the spinning dope. The flowable, honey-like material fell under its own weight into a spin shaft located below the pressurized cylinder and having a length of 2 m, where it reacted with the atmospheric humidity, as a result of which the flowability of the filaments decreased. The spin shaft was temperature and humidity controlled. The temperature was 25° C. and the atmospheric humidity was 35%.

Upon landing on the traversing table, the filaments retained their virtually cylindrical shape, but were still sufficiently flowable for them to adhere together at their areas of contact to form fibrous nonwoven webs.

The fibrous nonwoven webs were then aired in a drying cabinet at ca. 30° C. and the acid content was thereby further reduced. The acid strength was reduced in the process to a physiologically compatible level.

The fibrous nonwoven web produced in Example 1 was subjected to a cytotoxicity test in accordance with ISO 10993-5 (1999); EN 30993-5 (1994). The cytotoxicity measured, compared to the values determined for the controls, revealed that the fibrous nonwoven web produced according to the invention had no cytotoxic properties.

Comparative Example

The starting materials TEOS (tetraethoxysilane), EtOH, $H_2O$ and $HNO_3$ were mixed in the molar ratio of 1:1.26:X: 0.01 (where X=1.6, 1.7, 1.8, 1.9 and 2.0) and vigorously stirred at room temperature for 5 hours. The resulting solution was suspended in an open vessel in a water bath heated to 70° C., where they remained until a defined weight loss had occurred. The reaction mixture was then cooled and filtered through a stainless steel gauze having a mesh size of 1 mm×1 mm. The filtrate was exposed in a closed vessel at a temperature of 3° C. to a ripening time of from 6 hours to 6 months, depending on weight loss. The resulting spinning dope was very homogeneous and stable and spinnable for some time. The fibres were produced on a dry-spinning system. For this, the spinning dope was filled into a spin head cooled to −15° C. and forced at a pressure of from 10 to 15 bar firstly through a stainless steel gauze having a mesh size of 80×80 µm and then through a die having a diameter of 100 µm. After a drying section of 1 m, the resulting continuous filament was wound up on a rotating cylinder. The resulting fibres exhibited round, oval or dumbbell-shaped cross sectional shapes with diameters between 5 µm and 30 µm depending on the batch, i.e. the amount of water added. The cross sectional areas are between 100 µm² to 400 µm².

The fibre surface is smooth and in no case exhibits an undulating profile. Tensile-strength measurements on the fibres revealed values from 100 MPa to 800 MPa. IR spectra prepared from the fibre material show an Si—OH band at 950 $cm^{-1}$ and C—H signals at 3000 $cm^{-1}$. Thus, partially hydrolysed and partially condensed ethoxy-silanol fibres are present. After storage for 2 months at room temperature, the IR spectrum no longer reveals any C-H vibration bands. The fibres have converted into partially condensed silanol fibres which are stable over a period of several months.

Cytotoxicity measurements were carried out with the fibres produced in this way.

Cytotoxic effects were established for the fibre material produced therefrom in the cytotoxicity test in accordance with ISO 10993-5 (1999); EN 30993-5 (1994).

Also, only 50% of the total reaction batch could be spun

The invention claimed is:
1. Bioabsorbable polysiloxane (PSN) fibers obtained by:
   (a) carrying out a first hydrolysis-condensation reaction (HCR) of tetraethoxysilane (TEOS) acid catalysed at an initial pH of 0 to ≤7, in the presence of a water-soluble solvent, over a period of from 8 to 24 hours at a temperature of from 20° C. to 60° C., to obtain a material, (b) carrying out a second HCR of the material obtained in step (a), while at the same time removing the solvent by evaporation in a closed apparatus, in which thorough mixing of the material takes place and the evaporation takes place in vacuo from 1 to 1013 mbar, where at least one of pressure, and/or temperature is time-variably adjusted, and wherein, the temperature of the evaporation is from 30-90° C. and the step is carried out up to a viscosity of from 0.5 to 2 Pa·s (at 4° C. and 10 l/s), to form PSN material (c) cooling the PSN material from step (b) in a closed apparatus for a period of from a few minutes to a few hours, (d) converting the PSN material obtained from (c) into a ripened polysiloxane material (rPSN) material via a third HCR, for a period of one day up to 8 weeks to thereby achieve a dynamic viscosity of about 30 to 100 Pa·s, and (e1) spinning the ripened polysiloxane (rPSN) material into said bioabsorbable fibers, wherein the bioabsorbable polysiloxane (PSN) is non-cytotoxic in accordance with ISO 10993-5, wherein more than 30% of the ethoxy group from the TEOS are present.

2. The bioabsorbable polysiloxane (PSN) fibers according to claim 1, wherein the evaporation in step b) takes place at a constant temperature and time-variable pressure.

3. The bioabsorbable polysiloxane (PSN) fibers according to claim 1, wherein the evaporation in step b) comprises using a chemically inert entrainment gas stream, and wherein at least one of pressure, entrainment gas stream and/or temperature is time-variably adjusted.

4. The bioabsorbable polysiloxane (PSN) fibers according to claim 3, wherein the entrainment gas stream is distributed by a gas distributor suitably arranged in a gas space of the apparatus in such a way that adequate entrainment gas exchange is ensured just above a liquid surface but without flow toward a liquid surface in a direct convective manner.

5. The bioabsorbable polysiloxane (PSN) fibers according to claim 1, wherein the water-soluble solvent is ethanol or an ethanol/water mixture.

6. The bioabsorbable polysiloxane (PSN) fibers according to claim 1, wherein the pH from 0 to ≤7 in step (a) is established with dilute nitric acid and/or with an acidic mixture or solution of (i) a physiologically compatible acid and (ii) a substrate of nitroxide synthase (NOS).

7. The bioabsorbable polysiloxane (PSN) fibers according to claim 6, wherein dilute nitric acid is used in a molar ratio of TEOS to nitric acid from 90:1 to 110:1.

8. The bioabsorbable polysiloxane (PSN) fibers according to claim 3, wherein the entrainment gas stream used is nitrogen and/or air.

9. The bioabsorbable polysiloxane (PSN) fiber according to claim 1, wherein the evaporation in step b) takes place at a variable subatmospheric pressure of <600 mbar.

10. The bioabsorbable polysiloxane (PSN) fiber according to claim 1, wherein in step b), the temperature of the evaporation is between about 60-90° C.

11. The bioabsorbable polysiloxane (PSN) fiber according to claim 1, wherein the sol in step (c) is cooled down to −20° C. to +10° C. and is optionally adjusted to atmospheric pressure.

12. The bioabsorbable polysiloxane (PSN) fiber according to claim 1, wherein the ripening in step (d) takes place at temperature of from 20° C. to 10° C.

13. The bioabsorbable polysiloxane (PSN) fiber according to claim 1, wherein step (d) is carried out up to a viscosity (at a shear rate of $10\ s^{-1}$ at 4° C.) of the material of from 30 to 100 Pa·s, with a loss factor (at 4° C., 10 l/s, 15 deformation) of from 2 to 5.

14. The bioabsorbable polysiloxane (PSN) material fibers according to claim 1, wherein the fibers are watered to hydrolyse remaining ethoxy groups still present.

15. The bioabsorbable polysiloxane (PSN) material fibers according to claim 1, wherein step (d) is from 3 to 18 days.

16. A fibrous nonwoven web produced from the fibers of claim 1.

* * * * *